July 30, 1940.   H. G. REIBEL   2,209,477
RESILIENT MOTOR MOUNT
Filed Nov. 3, 1938   2 Sheets-Sheet 1
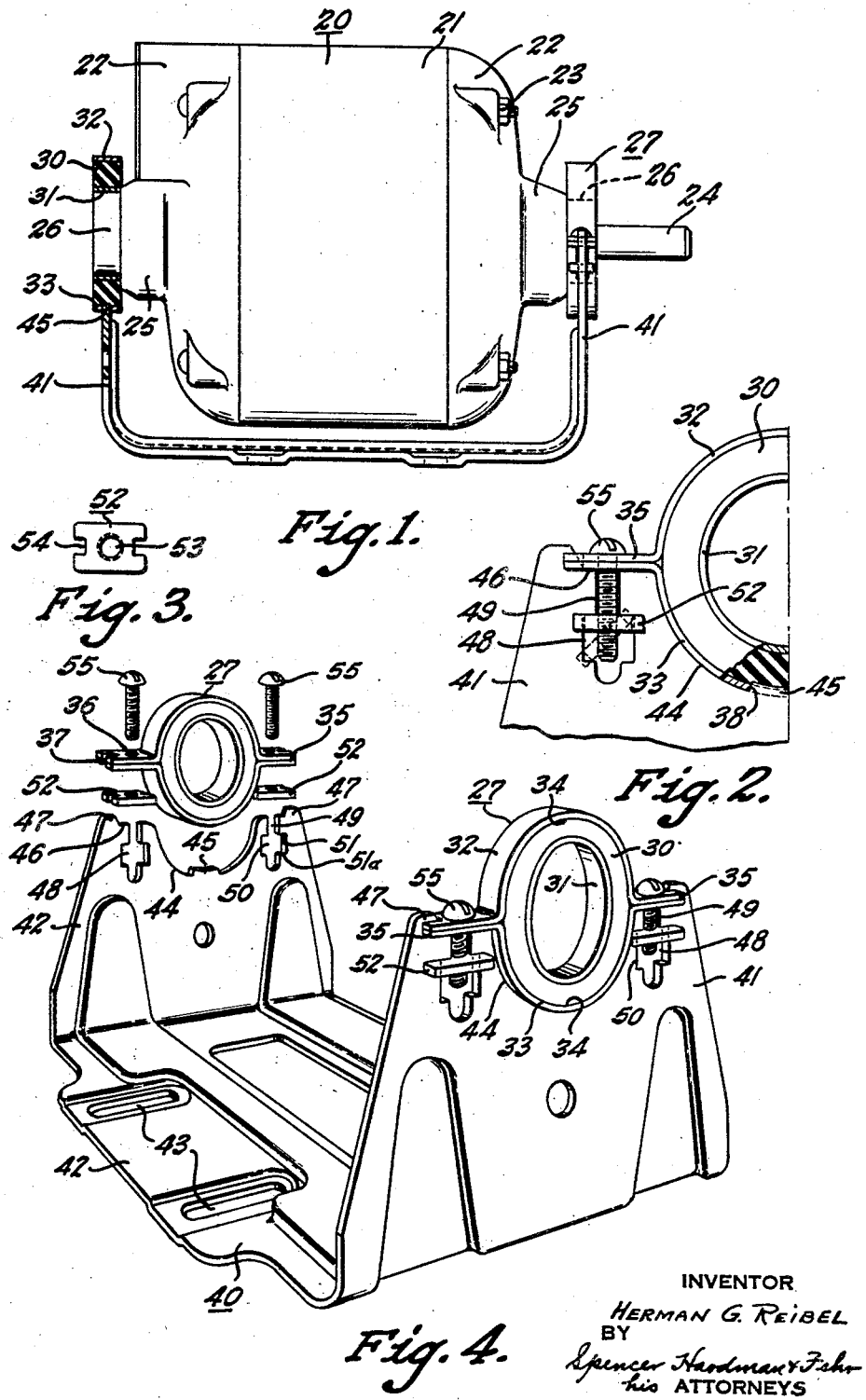
INVENTOR
HERMAN G. REIBEL
BY Spencer Hardman & Fahr
his ATTORNEYS INVENTOR
HERMAN G. REIBEL
BY
Spencer Hardman & Fehr
his ATTORNEYS Patented July 30, 1940

2,209,477

UNITED STATES PATENT OFFICE 2,209,477

RESILIENT MOTOR MOUNT

Herman G. Reibel, Warren, Ohio, assignor to General Motors Corporation, Detroit, Mich., a corporation of Delaware Application November 3, 1938, Serial No. 238,499

9 Claims. (Cl. 248—26)

This invention relates to resilient mounts for electric motors or other devices subject to vibrations.

An object of the present invention is to provide a resilient mount which will cushion the torsional vibrations of an electric motor which will be relatively rigid to external forces applied to the motor. This is accomplished by providing a mounting having an annulus of resilient material fitted on a boss of the motor for cushioning the vibrations and an improved arrangement for supporting the annulus.

Another object of the present invention is to provide a resilient mount which can be quickly, simply and efficiently assembled upon the supported and supporting members or can be quickly and easily removed therefrom.

Another object of the invention is to provide a resilient mount which can be manufactured economically since the tolerance limits of the main dimensions can be relatively large and which is highly efficient in use in dampening vibrations set up in the electric motor or other supported devices.

Further objects and advantages of the present invention will be apparent from the following description, reference being had to the accompanying drawings wherein a preferred embodiment of the present invention is clearly shown.

In the drawings:

Fig. 1 shows an electric motor mounted upon two resilient mounts, one of the mounts and adjacent portions being shown in vertical section.

Fig. 2 is a fragmentary view in end elevation of one form of the resilient mount embodied in the present invention, with parts of the mount being broken away to illustrate parts of the interior of said mount.

Fig. 3 is a plan view of a nut.

Fig. 4 is a perspective view of a base and a resilient mount embodying the present invention showing one mount assembled to the base and another mount in disassembled position.

Figure 5:
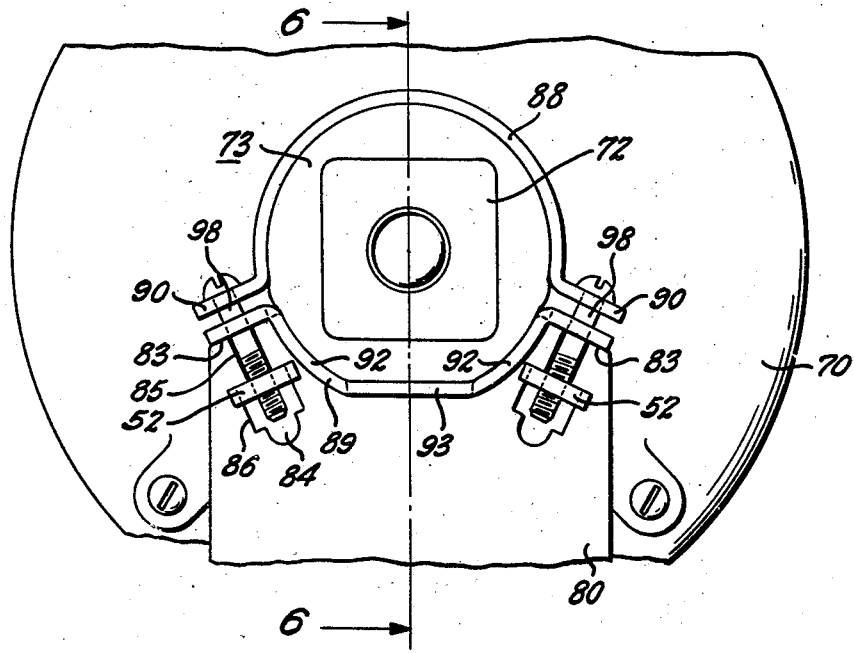
Fig. 5 is a fragmentary end view of a modification of a motor and a resilient mount.

One structure embodying the present invention is illustrated in Figs. 1 to 4 of drawings which show a cushioning mounting for an electric motor 20. The motor in this instance comprises a housing having a frame 21 and end members 22. The end members are secured to the frame by bolt and nut devices 23. The rotating member of the motor is secured to a shaft 24 which is journalled in the bosses 25 formed integrally with the end members 22. The bosses 25 are reduced as at 26. The vibration of the motor is cushioned by an annulus or ring 27 of resilient material, preferably rubber.

The resilient mount as shown in Figs. 1, 2 and 4 comprises an annulus or ring 30 of resilient material having a continuous metal band 31 bonded to the inner surface thereof. Preferably the band 31 is secured rigidly to the end member by forcing the band over the reduced portion 26. A pair of stiff metal straps, an upper strap 32 and lower strap 33, are adapted to surround the rubber ring 30. Each strap is formed to provide a medial bowed portion 34 between straight ends 35. The ends of each strap are each provided with an aperture 36 and a notch 37. The lower strap 33 is further provided with a slot 38 in its medial bowed portion 34.

The motor 20 is adapted to be mounted upon a base 40 so that the transmission of noise and vibration will be substantially eliminated or reduced to a minimum. The base 40 is preferably U-shape and comprises vertical arms or supports 41, and a yoke 42 having mounting openings 43. Each arm 41 is formed with a recess 44 with a tongue 45 extending upwardly from the bottom of the recess. Flat edge portions 46 and projections 47 are located on opposite sides of the recess 44. Extending downwardly from each flat edge portion 46 is a notch 48 having a narrow portion 49 and enlarged portion 50 to form shoulders 51 and 51a.

Preferably a plate 52 having a threaded opening 53 and notches 54 extending inwardly from the ends thereof is assembled within each of the notches 48. The plate 53 is so constructed that the axis of the opening 53 will be substantially midway of the narrow portion 49. The plate can be easily assembled within the enlarged section of the notch 48. This is accomplished by inserting the plate in the narrow portion 49 on the vertical and then turning the plate in one direction or the other, as indicated by the dotted lines in Fig. 2, so that the notches 53 will straddle the thickness of the metal of the arms 42 and rest upon the lower shoulder 51a. The notches 53 prevent the plate 52 from turning relative to the arm 42.

In mounting the motor 20 upon the base 40, the ring 31 with the resilient annulus 30 attached thereto is first forced over the reduced portion 26 of the boss 25. Then the straps 32 and 33 are placed about the rubber annulus 30 with the flat ends of each strap lying in planes substantially parallel to each other. It is to be understood that the strap may be bonded to the annulus. When the motor is lowered into the recess 44 of the arms 41, the lower strap 33 will enter the recess with the tongue 45 registering with the slot 38 and the ends 35 of strap 33 resting upon the flat portions 46. The notches 37 of both straps will straddle the projections 47. The tongue 45 and the projections 47 operate to prevent the straps 32 and 33 from turning relative to the arms 41.

The straps 32 and 33 are secured to the arms 41 by bolts 55. The bolts extend through aligned apertures 36 in the ends of the straps and through the upper narrow portion 49 and into the slot 48. The bolts are then threaded in the openings 53 of the plates 52. By turning the bolt in one direction the bolt first draws the plate 52 against the upper shoulder 51. Continued movement of the bolt will draw the strap 32 toward the strap 33 which forces the straps into firm frictional engagement with the rubber annulus 31 and hold the ends 35 of the strap 33 firmly against the flat portion 46 and the outer surface of the bowed portion 34 of the strap 33 against the edges of the recess 44. Thus the strap 33 is locked firmly in position within the recess. Also the annulus 31 is held against a turning movement relative to the straps therefore only a slight rotary movement of the motor relative to the annulus is permitted due to the elasticity of the annulus 30.

Figures 6, 7:
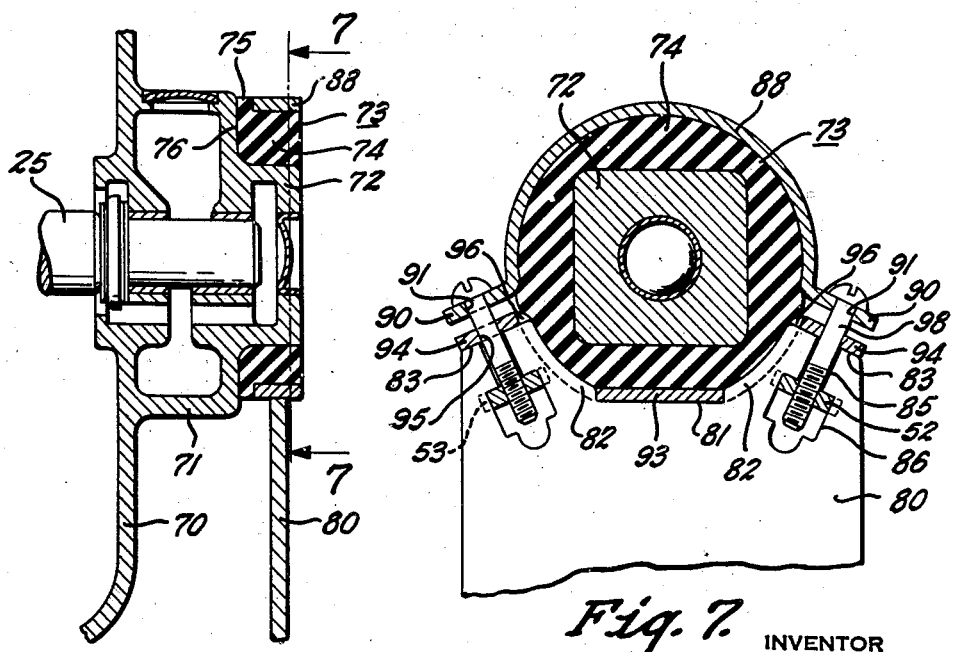
Fig. 6 is a sectional view taken on the line 6—6 of Fig. 5.
Fig. 7 is a sectional view taken on the line 7—7 of Fig. 6.

In Figs. 4 to 7 inclusive a modification of the present invention is shown. The motor 20 in this instance is provided with end members 70 having bearing member 71 provided with bosses 72 of non-circular formation projecting therefrom. The bearing members rotatably support the armature shaft 25. The bosses 72 are adapted to fit within a cushioning block 73 preferably of soft rubber or its equivalent. Each block is provided with a non-circular opening similar to the contour of the boss. Each block is provided with a main body portion 74 and a flange 75. The outer surface of the flange 75 is adapted to engage a flat surface 76 provided on the end member and operates to cushion any axial movements of the motor.

The U-shape 40 base in this instance is provided with arms 80 having a recess 81 that is formed to provide arcuate tongues 82 and a pair of angularly disposed flat surfaces 83. Extending inwardly from and at substantially right angles to the flat surfaces 83 are notches 84 having a narrow portion 85 and an enlarged portion 86. Each notch is adapted to receive a plate 52 which is assembled within the notch 84 so that the grooves 53 will straddle the metal thickness of the arm.

Two straps 88 and 89, preferably made of stiff metal, are adapted to fit about the main body portion 74 of the rubber block 73. The strap 88 is provided with a medial portion of circular formation and having its ends 90 bent at an angle. The ends are each provided with an aperture 91. The strap 89 is formed to provide arcuate portions 92, a medial flat portion 93 and ends 94 having apertures 95. The ends 94 are bent at an angle corresponding to the angle of the flat surfaces 83 so that they will rest thereupon. The arcuate portions 93 of the band 89 are provided with a slot 96 to receive the tongues 82 which operate to prevent axial movement of the motor relative to arms 80. The space between the two tongues 82 is adapted to receive the flat portion 93 of the strap 89 which prevents rotary movement of the straps relative to the arms.

In mounting the modified form of the motor 20 upon the arms 80, the cushioning block 73 is first slipped over the bosses 72 with the outer surface of the flange 75 adjacent the flat surface 76 of the bearing member 71. The straps 88 and 89 are placed about the main body portion 74 of the block. When the housing is lowered in the recesses of the arms 80, the flat portion 93 will seat itself between the tongues 82 while the notches 96 will receive the tongues. Thus the strap 89 is locked temporarily in position upon the arms. The straps 88 and 89 are firmly locked in position by bolts 98 which operate in a similar manner as previously described for bolts 55. When the bolts 98 are drawn down tight, the strap 89 is locked firmly in position and prevented from turning relative to the arm 80. The cushioning blocks 73 are held substantially against movement with respect to the straps 88 and 89 and also against turning movement with respect to the boss 72. Therefore only a slight rotary and axial movement of the motor relative to the blocks is permitted due to the elasticity of the cushioning blocks 73.

While the embodiment of the present invention as herein disclosed, constitutes a preferred form, it is to be understood that other forms might be adopted, all coming within the scope of the claims which follow.

What is claimed is as follows:

1. Supporting means for a device having a boss comprising, a metal base having an end provided with a recess and straight edge surfaces on opposite sides of the recess and in the plane of the brake end, said straight edge surfaces having notches extending inwardly therefrom, a nut non-rotatably supported within the notches; straps about the hub one of the straps having its ends resting on the straight edge surfaces; and means extending through the strap ends and into the notches and having screw threaded engagement with the nut for securing the straps in assembled relation with the base end whereby the clamping force securing the straps about the hub will be coincident with the plane of the base end.

2. Supporting means for a device having a boss comprising, a metal base having an end with a recess with a projection therein and having flat edge surfaces on opposite sides of the recess and in the plane of the base end, said flat edge surfaces having notches extending inwardly therefrom; a nut non-rotatably supported within the notches; straps about the hub, one of said straps having notches registering with the projection in the recess and having its ends resting on the flat edge surfaces; and means extending through the straps and having screw threaded engagement with the nuts and cooperating with the nuts for securing the straps in assembled relation with the base end whereby the clamping force securing the straps about the boss will be confined to a plane within the body of the base end.

3. Supporting means for an electric motor having a boss, comprising in combination; a support having an end provided with a recess open at one end and having flat edge portions on each side of the recess and in the plane of the support end, said flat edge portions having notches extending inwardly therefrom; nuts supported non-rotatably in the notches; an annulus of resilient material fitted on the boss; a pair of spaced arcuate metal bands secured to the annulus, said straps having apertured flanges thereon; means for guiding one of the straps in a plane coincident with the plane of the support; and bolts extending through the apertures of the flanges and having threaded engagement with the nuts for securing the bands in assembled relation with the support.

4. Supporting means for a device having a boss comprising, a sheet metal base having an end provided with a recess with a projection therein and having flat edge surfaces and ears in the same plane of the base end and on opposite sides of the recess, said flat edge surfaces having notches extending inwardly therefrom; a plate non-rotatably supported within the notches; straps about the boss, said straps being provided with ends with notches therein adapted to straddle the ears to guide the straps in a plane coincident with the plane of the base end and to prevent longitudinal movement of the strap relative to the base end; and means extending through the strap ends and having screw threaded engagement with the plate for securing the straps in assembled relation with base end.

5. Supporting means for a shaft of a rotary mechanism comprising in combination; a shock absorbing annulus adapted to engage a bearing boss; a pair of metallic bands surrounding the annulus and providing oppositely extending apertured lugs; and means for securing the bands in supporting relation with the annulus comprising a cradle having upstanding end portions, said end portions being substantially rectangular plane portions having their normally free ends notched to provide ears at the corners thereof and an intermediate recess, the portions between the ears and the recess having cutouts opening to the normal free edge by relatively narrow portions, said cutouts adapted to receive a nut having notches adapted to engage the edges of said cutouts, said band members having notches adapted to engage the ears of said end members when assembled therewith; and screw devices engaged by the apertured lugs of said band members and cooperating with the nuts in said cutouts for securing the band members in assembled relation with the cradle whereby the clamping force securing the band members about the annulus will be confined to a plane within the body of the end members.

6. Supporting means for a rotary device having a hub comprising in combination; a shock absorbing member of resilient material adapted to engage the hubs; a pair of band members surrounding the shock absorbing member and providing a pair of oppositely extending apertured lugs; and means for securing the band members in supporting relation with the shock absorbing member comprising a standard having its normally free end provided with a recess and having straight edge portions on each side of the recess, the straight edge portions having cutouts opening to the straight edge portions by relatively narrow portions, a nut, non-rotatably supported within the cutouts; and screw devices, extending through apertured lugs of the band members and the narrow portions of the cutouts and cooperating with the nuts for securing the band members in assembled relation with the standard whereby the clamping force securing the bands about the shock absorbing member will be confined to a plane within the body of the standard.

7. Supporting means for an electric motor comprising in combination; a shock absorbing annulus of resilient material adapted to engage a bearing boss; a pair of band members surrounding the annulus and providing angular extending apertured lugs; and means for securing the bands in supporting relation with the annulus comprising a cradle having upstanding end portions, said end portions having their normally free ends provided with a recess and having straight edge portions on each side of the recess, the straight edge portions having cutout portions opening to the straight edge portions by relatively narrow portions, said cutouts adapted to receive a plate having notches adapted to engage the edges of the cutouts, one of said band members and a cradle end portion having provisions cooperating with each other to prevent axial movement of said band member relative to the end portion; and means extending through the apertured lugs and having screw threaded engagement with the plate for securing the band members in assembled relation with the cradle, whereby the clamping force securing the band members about the annulus will be confined to a plane within the body of the end portion.

8. An assembly device comprising in combination; a support having its normally free end provided with a recess to receive an object, said support having edge surfaces and cutouts disposed on each side of the recess; members non-rotatably supported within the cutouts; a pair of band members surrounding the object and providing a pair of oppositely disposed lugs adapted to extend over the edge surfaces of the support; and means engaging the lugs and cooperating with the members in the cutouts for securing the band members in assembled relation with the support whereby the clamping force securing the band members about the object will be confined to a plane within the body of the support.

9. Supporting means for an electric motor having a pair of axially disposed bosses on the motor; a shock absorbing annulus of resilient material adapted to engage each of the bosses; a pair of clamping members surrounding each annulus and providing apertured flanges; means for securing the clamping members in supporting relation with each annulus comprising standards having their normally free ends provided with recesses and having edge surfaces on each side of the recesses; plates supported non-rotatably on the standards below the edge surfaces; and means having screw threaded engagement with the plates for securing the clamping members in assembled relation with the standards whereby the clamping force securing the clamping members about each annulus will be confined to a plane coincident with the plane of each standard.

HERMAN G. REIBEL.